United States Patent [19]

Lampert

[11] Patent Number: 4,499,813
[45] Date of Patent: Feb. 19, 1985

[54] PISTON-CYLINDER DEVICE

[75] Inventor: Heinz Lampert, Buchs, Switzerland

[73] Assignee: Werner Looser Maschinenbau+Hydraulik, Riedern, Switzerland

[21] Appl. No.: 437,448

[22] Filed: Oct. 28, 1982

[30] Foreign Application Priority Data

Nov. 10, 1981 [CH] Switzerland ................. 7228/81

[51] Int. Cl.³ .............................................. F01B 3/00
[52] U.S. Cl. .................................. 92/31; 92/116; 92/165 PR
[58] Field of Search ............... 92/31, 33, 116, 165 PR

[56] References Cited

U.S. PATENT DOCUMENTS

| 2,237,970 | 4/1941 | Pabst | 92/31 X |
| 3,453,938 | 7/1969 | Fewel | 92/33 X |
| 3,722,371 | 3/1973 | Boyle | 92/31 X |
| 3,834,283 | 9/1974 | Beichel et al. | 92/33 |
| 3,835,753 | 9/1974 | Bunyard | 92/165 PR |
| 3,961,565 | 6/1976 | Lampert | 92/117 R |

Primary Examiner—Robert E. Garrett
Assistant Examiner—Timothy E. Nauman
Attorney, Agent, or Firm—James E. Nilles

[57] ABSTRACT

In a piston-cylinder device, a guide ring (11) that is provided with helical flutings (12, 26) is arranged between the piston (25) and the cylinder (2). This guide ring (11) has an inner fluting (12). With this it engages an outer fluting (26) on the piston (25). The outer ring surface (13) is smooth. It is provided with full length grooves (15) in order to conduct the pressure medium beneath the lifting piston. The piston (25) is fluted (26) only on one portion of its outer surface. The inclination of this helical fluting (12, 26) amounts to 10°–60°. A rotation-preventing plate (21) holds the piston (25) against rotation. This piston-cylinder device is formed especially for very high and also for eccentric loadings.

7 Claims, 4 Drawing Figures

PISTON-CYLINDER DEVICE

The present invention relates to a piston-cylinder device wherein there is arranged between the piston and the cylinder a guide ring provided with a helical fluting.

U.S. Pat. No. 3,961,565 (corresponding to Swiss Pat. No. 576,598) discloses a piston-cylinder device which ensures the parallelism-maintaining characteristics of the piston and cylinder surfaces. In this device, a cylindrical guide ring is arranged between the piston and a coaxial element that is fixed in one end of the cylinder and projects into the piston. The guide ring is provided on its inner and outer surfaces with oppositely extending helical flutings which are respectively engaged with said fixed coaxial element and with the piston wall. The guide ring moves axially and rotationally relative to the cylinder, and the piston moves similarly relative to the guide ring.

This construction is not optimally configured with respect to efficiency, manufacturing cost or material requirements. A further development in this respect is offered by the present invention, with a piston-cylinder device which is formed especially for very high loadings, and even eccentric ones, and which is distinguished in that the guide ring is provided only with a helical inner fluting which engages in a helical outer fluting on the piston and is confined against axial motion relative to the cylinder.

Exhaustive calculations have shown that in this manner more advantageous forces and moment distributions arise, especially with eccentric or so-called skewed loading of the piston, so that the piston-cylinder device according to the invention also lends itself particularly to eccentrically imposed load conditions.

An exemplary embodiment of the inventive subject matter is explained in connection with the accompanying drawings, wherein.

Figure 1:
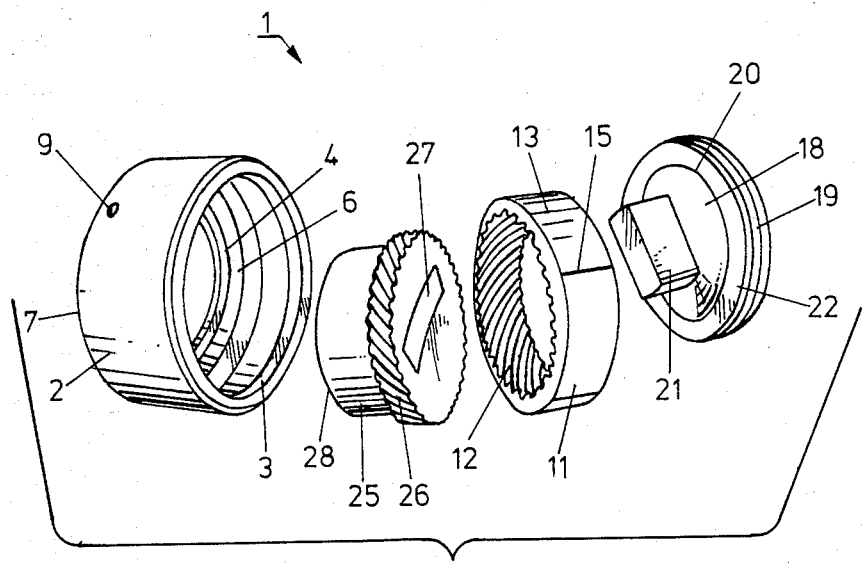
FIG. 1 is a disassembled perspective view, in assembly sequence, of the individual parts of a piston-cylinder device of this invention.

The piston-cylinder device illustrated in FIG. 1 is a so-called short cylinder device actuated by pressure medium, of a type in which the danger that the piston will jam in the cylinder is especially great. This piston-cylinder device 1 comprises a cylinder 2 with a bottom inner thread 3 and a lift limiting collar 4. A ring seal in a ring groove 6 of the cylinder 2 serves to seal the piston in the cylinder 2. At the top surface there is further provided a hole 7 for receiving a wiper. At the side there is a pressure medium connection bore 9 into which a suitable nipple can be screwed.

Figure 2:
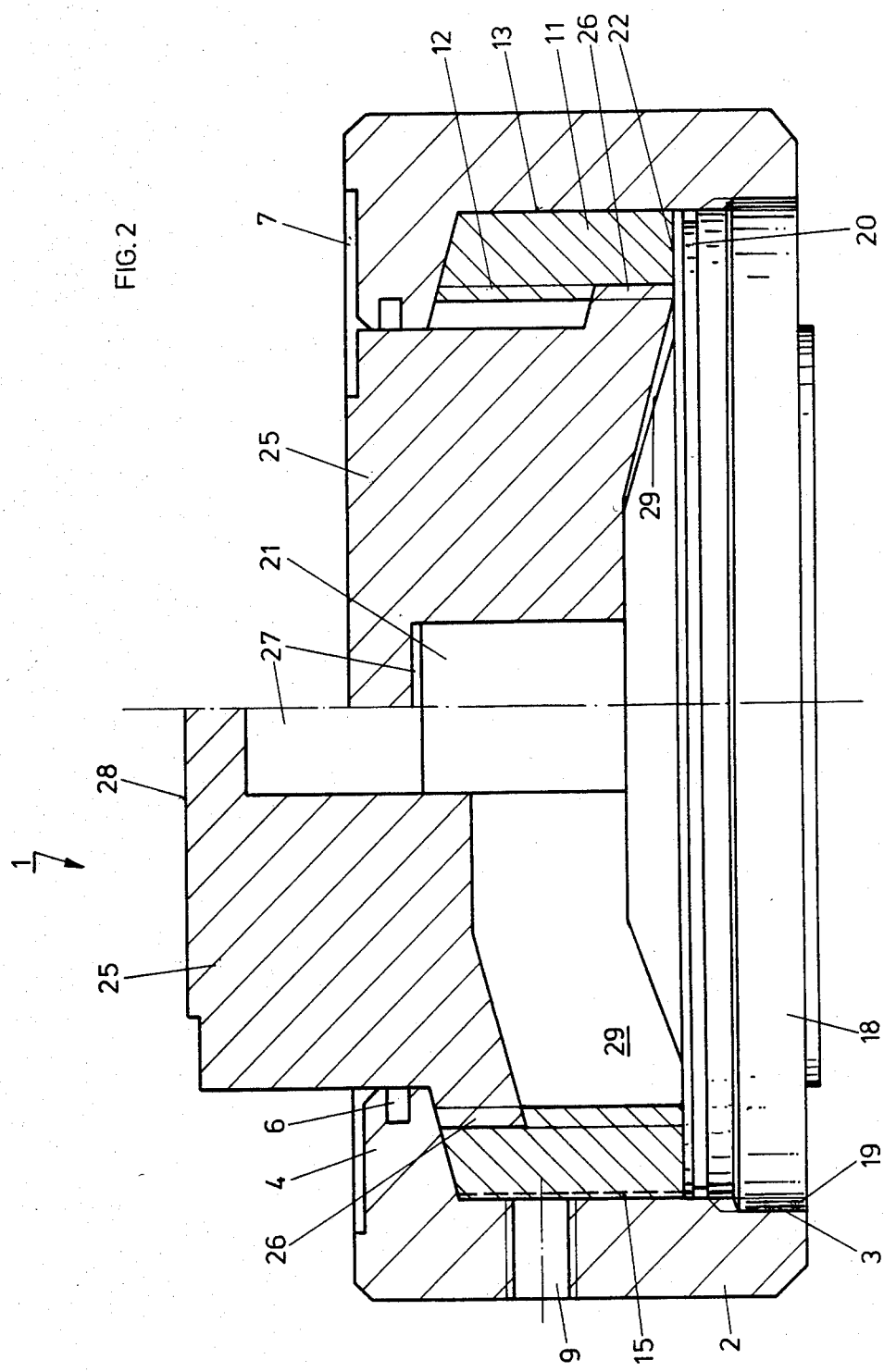
FIG. 2 is a double axial section through a piston-cylinder device, shown in the left half with the piston extended and in the right half with the piston retracted.

The cylinder 2 is arranged to receive a cylindrical guide ring 11 that is provided with an inner helical fluting 12. With respect to the outer surface of the guide ring 11, it is a smooth annular outer surface 13 which is provided with full length grooves 15, one of which is indicated in FIG. 2, for conducting pressure medium beneath the piston. However, it is also possible to provide the outer surface wholly or partly with a fluting that extends oppositely to the fluting 12 and the cylinder 2 with a corresponding inner fluting. In that case, however, the ring 11 is substantially less high.

A bottom 18 with an external thread 19 can be screwed into the bottom internal thread 3 of the cylinder 2. The bottom 18 has a circumferential groove 20 for the purpose of receiving an O-ring. In the middle, there can be a rotation-preventing plate 21 for confining the piston against rotation, while outwardly the bottom 18 is provided with a supporting edge 22 for the guide ring 11.

A piston 25 carries at its one outer portion a helical outer fluting 26 which, after assembly, is engaged with the helical inner fluting 12 of the guide ring 11. To confine the piston 25 liftably and lowerably against rotation in the cylinder 2, a plate-like opening 27 is provided which receives the rotation preventing plate 21 of the bottom upon assembly. The device is, however, functionally satisfactory without the rotation-preventing plate. The lifting surface 28 of the piston 25 is externally reduced. Between the piston 25 and the bottom 18 there is a pressure chamber 29 in which the pressure medium arrives under the piston by way of the connecting bore 9 and the full length grooves 15 and raises it during feeding of pressure medium or lets it descend when pressure medium is allowed to flow away.

By this construction there is obtained a securely untiltable guidance and bearing of the piston 25 by means of its outer fluting 26 and the inner fluting 12 of the guide ring 11, wherein the guide ring 11 turns in the cylinder 2 with rising and descending of the piston 25. In this manner, under stressing of both the piston 25 and the guide ring 11, and of their flutings 26, 12, as well as the lift limiting collar of the cylinder 2, they will themselves remain functionally satisfactory under high eccentric loadings of the piston 25, and will suffer neither tilting nor relatively permanent deformations or breaks in critical places.

The slope of the thread-like flutings can amount to 10° to 60°, of which about 20° or 30° illustrates a useful value. The angle can, however, be basically of any value in this region, according to the application purpose for the combination, and thus also 10°, 40°, 45°, 50° or 60°.

It is also possible to provide the grooves 15 in the wall of the cylinder 2, or even to provide the guide ring 11 as well as the cylinder 2 with such grooves 15.

Figure 3:
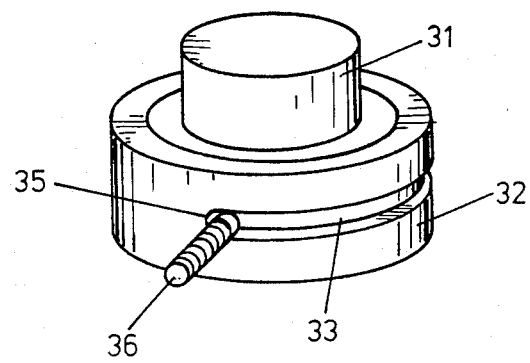
FIG. 3 is a schematic illustration of a piston with guide ring and limiting groove with bolt.

In order to hold the loading of the sealing flange of the cylinder 2 at a low value when the piston is extended, or to arrange the device to have a lower structural height, a premature arresting of the guide ring can be provided for. A construction of that type is illustrated schematically in FIG. 3, which shows an inner piston 31 surrounded by a guide ring 32. The latter is provided with a guide groove 33, the end abutment 35 of which limits the rotational movement of the guide ring 32 with the help of a pin screw 36. This pin screw 36 extends laterally through the cylinder and projects into the groove 33. The guide ring 32, which has play relative to the lift limiting collar 4 of the cylinder 2, turns, since the piston 31 is confined against rotation in its axial movement in the cylinder 2. Before the piston 31 arrives at its upper limit position according to the left half of FIG. 2, the guide ring 32 is turned to a position in which the pin screw 36 runs into the abutment 35 and prevents a further rotational movement of the guide ring 32 and thereby a further elevation of the piston 31.

It is thus assured that the piston 31 in its extended position will not, under load, lie against the lift limiting collar 4 and load the latter.

Figure 4:
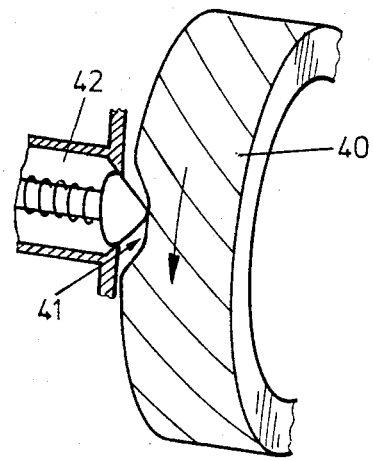
FIG. 4 is a section through a guide ring with a control curve for a pressure medium valve.

The same effect can be achieved with a non-rotatable piston by means of a construction such as FIG. 4 shows. Here the guide ring 40 has a control cutout which serves for control of a spring-loaded control valve 42 for medium. This very schematically illustrated embodiment shows that normally the valve body of the control valve 42 runs on the cylindrical outer surface of the guide ring 40 and thus maintains its open position. As a result, pressure medium arrives under the working piston 25. However, before this piston arrives at its upper limit position, the valve body of the control valve 42 falls into the cutout 41 so that its pressure spring can then press the valve body onto its valve seat and the valve closes. A further feeding of pressure medium is thus no longer possible, and the working piston 25 is prevented from pressing with full working force against the lift-limiting collar 4 of the cylinder 2.

While an axial control motion of the valve 42 is provided in FIG. 4, this control can also be accomplished radially, for which it is merely necessary that the control cutout 21 be in the actual exterior surface of the ring.

I claim:

1. A device for exerting thrust forces, comprising a cylinder having a bore that is closed at an inner end of the cylinder and open at an outer end thereof, and a piston axially slidable in the cylinder and having an inner end cooperable with the inner end portion of the cylinder to define an expansible and contractable fluid chamber into which fluid can be delivered under pressure to force the piston through an extension stroke which is limited to a predetermined length that is small in relation to the diameter of the piston, said piston having a coaxial load supporting element fixed thereto which projects outward therefrom through the outer end of the cylinder and which moves outward relative to the cylinder in said stroke, said device being characterized by:
   A. a guide ring inside the cylinder, surrounding the piston adjacent to its inner end, said guide ring having a concentric substantially cylindrical radially outer surface that is closely received within the cylinder and is substantially smooth to be rotatable in the cylinder;
   B. axially oppositely facing circumferential abutment means on the guide ring and on the cylinder, confining the guide ring against axial motion relative to the cylinder and thereby confining the guide ring to rotation relative to the cylinder; and
   C. said guide ring and the piston having interengaged helical flutings on their radially opposed surfaces, there being on each of those surfaces a plurality of said flutings at circumferentially spaced intervals therearound, said flutings being oriented to translate axial movement of the piston in its said extension stroke and in an opposite retraction stroke relative to the cylinder into relative rotation between the guide ring and the piston and serving to distribute non-coaxial load forces on the piston circumferentially around said radially opposed surfaces to prevent tilting of the piston relative to the cylinder.

2. The device of claim 1, further characterized by:
   D. said guide ring
      (1) having an axial length greater than the length of said stroke and
      (2) being confined in the cylinder adjacent to said inner end thereof.

3. A device for exerting thrust comprising a cylinder having a bore that is closed at an inner end of the cylinder and open at an outer end thereof, and a piston axially slidable in the cylinder and having an inner end cooperable with the inner end portion of the cylinder to define an expansible and contractable fluid chamber into which fluid can be delivered under pressure to force the piston through an extension stroke which is limited to a predetermined length that is small in relation to the diameter of the piston, said piston having a load supporting outer end portion that moves outward relative to the cylinder in said stroke, said device being characterized by:
   A. the piston having an enlarged diameter coaxial portion adjacent to its inner end;
   B. a guide ring inside the cylinder, surrounding said enlarged diameter portion of the piston, said guide ring
      (1) having an axial length greater than the length of said stroke and
      (2) having a substantially cylindrical radially outer surface that is closely received within the cylinder and is substantially smooth to be rotatable in the cylinder;
   C. axially oppositely facing circumferential abutment means on the guide ring and on the cylinder, confining the guide ring adjacent to said inner end of the cylinder and against axial motion relative to the cylinder and thereby confining the guide ring to rotation relative to the cylinder; and
   D. said guide ring and said enlarged diameter portion of the piston having interengaged helical flutings on their radially opposed surfaces, there being on each of those surfaces a plurality of said flutings at circumferentially spaced intervals therearound, said flutings being oriented to translate axial movement of the piston in its said extension stroke and in an opposite retraction stroke relative to the cylinder into relative rotation between the guide ring and the piston and serving to distribute non-coaxial load forces on the piston circumferentially around said radially opposed surfaces to prevent tilting of the piston relative to the cylinder.

4. The device of claim 3, further characterized by:
   E. said guide ring and the cylinder cooperating to define at least one axially extending fluid passage that communicates a laterally opening port in the cylinder with said fluid chamber.

5. The device of claim 3, further characterized by:
   F. slidably engaged axially extending means on the cylinder and on the piston confining the piston against rotation relative to the cylinder.

6. The device of claim 5, further characterized by:
   G. cooperating circumferentially spaced stop means on the cylinder and on said guide ring for limiting rotation of the guide ring relative to the cylinder and thereby confining the piston to axial motion between defined limits.

7. The device of claim 3, further characterized by:
   (1) said abutment means on the cylinder defining a concentric reduced diameter portion of its bore adjacent to its outer end; and
   (2) the piston having a concentric smaller diameter portion which extends outwardly from its said enlarged diameter portion and which is closely slidably received in said reduced diameter portion of the cylinder bore.

* * * * *